United States Patent

[11] 3,522,756

| [72] | Inventors: | Wolf von Wolff |
| | | Emmendingen, Germany, |
| | | Dieter Bertelsmann, |
| | | Emmendingen, Germany, |
| [21] | Application No.: | 755,110 |
| [22] | Filed: | Aug. 26, 1968 |
| [45] | Patented: | Aug. 4, 1970 |
| [73] | Assignee: | Max Langensiepen Kom. Ges. |
| | | Emmendingen, Germany, |
| | | a firm |
| [32] | Priorities: | Aug. 24, 1967 |
| [33] | | Germany, |
| [31] | | No. L 45474; |
| | | April 5, 1968, France, No. 9130 |

[54] AXIALLY SPLIT EXPANDING PLUG OF ELASTICALLY FLEXIBLE MATERIAL FOR AN ANCHOR BOLT OR SCREW
5 Claims, Drawing Figs.

[52] U.S. Cl. .................................... 85/83, 85/84
[51] Int. Cl. .................................... F16b 13/06
[50] Field of Search ........................... 85/80, 81, 82, 83, 84, 64, 63, 19, 20, 21

[56] References Cited
UNITED STATES PATENTS

| 625,216 | 5/1899 | Tobey.................... | 85/84 |
| 2,095,153 | 10/1937 | Rosenberg............... | 85/19 |
| 2,877,682 | 3/1959 | Barry et al............... | 85/84 |
| 3,236,145 | 2/1966 | Schenkel................ | 85/83 |
| 3,383,976 | 5/1968 | Schenkel................ | 85/83 |

FOREIGN PATENTS

| 652,838 | 9/1964 | Belgium Zinser..... | 85/83 |
| 335,508 | 9/1930 | Great Britian | 85/84 |
| 508,673 | 7/1939 | Great Britain | 85/19 |
| 1,048,548 | 11/1966 | Great Britain | 85/83 |
| 1,458,166 | 5/1965 | France Faiuettaz... | 85/83 |
| 1,465,309 | 11/1966 | France | 85/84 |

*Primary Examiner*— Marion Parsons, Jr.
*Attorney*— Jacob L. Kollin

ABSTRACT: The invention provides an axially split expanding plug which has a tubular portion at its rear end and elevations projecting from its peripheral contours. The divided portion of the plug comprises at least along part of its length consecutive sections of polygonal cross section. Each section is angularly offset in relation to the adjoining sections in such a way that the corners of one section project beyond the flats or like surface portions of an adjoining section.

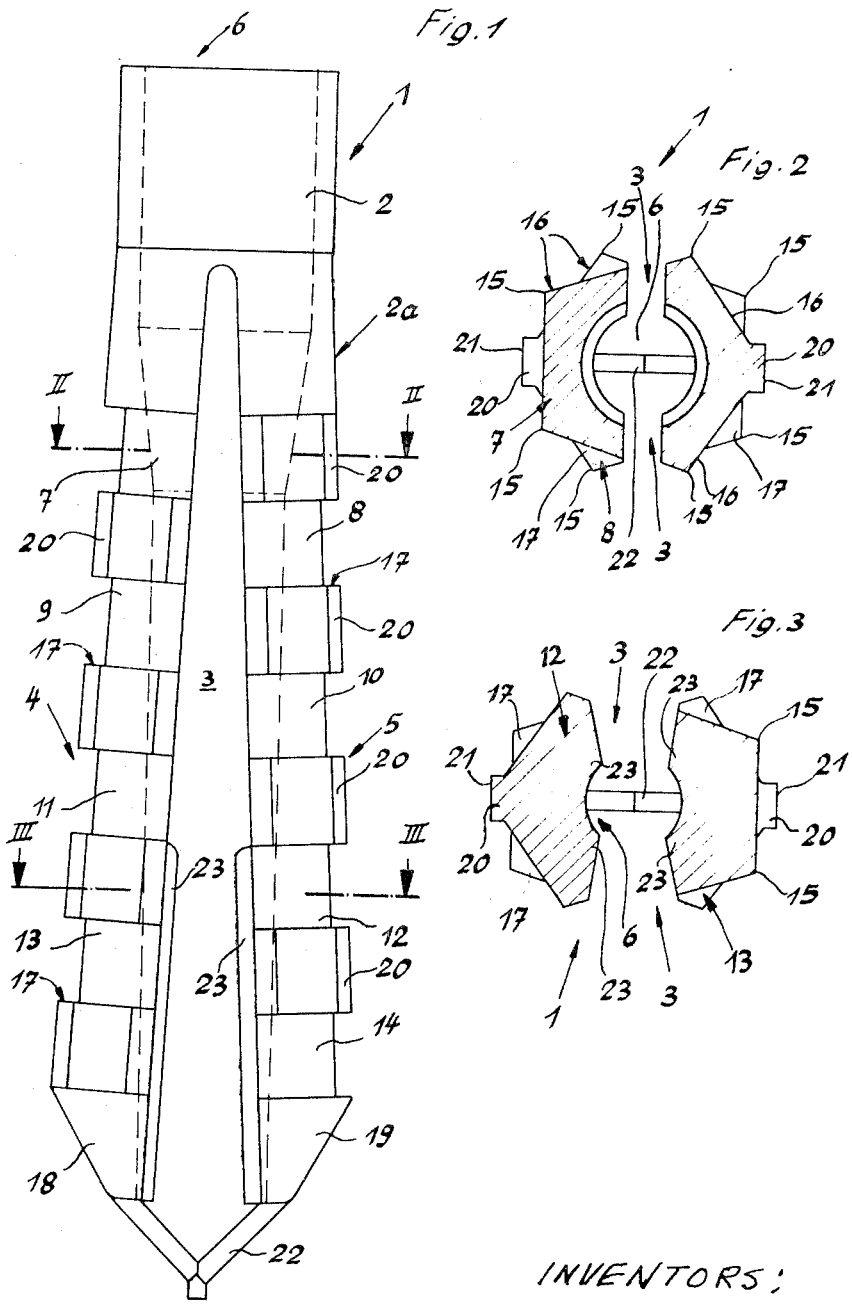

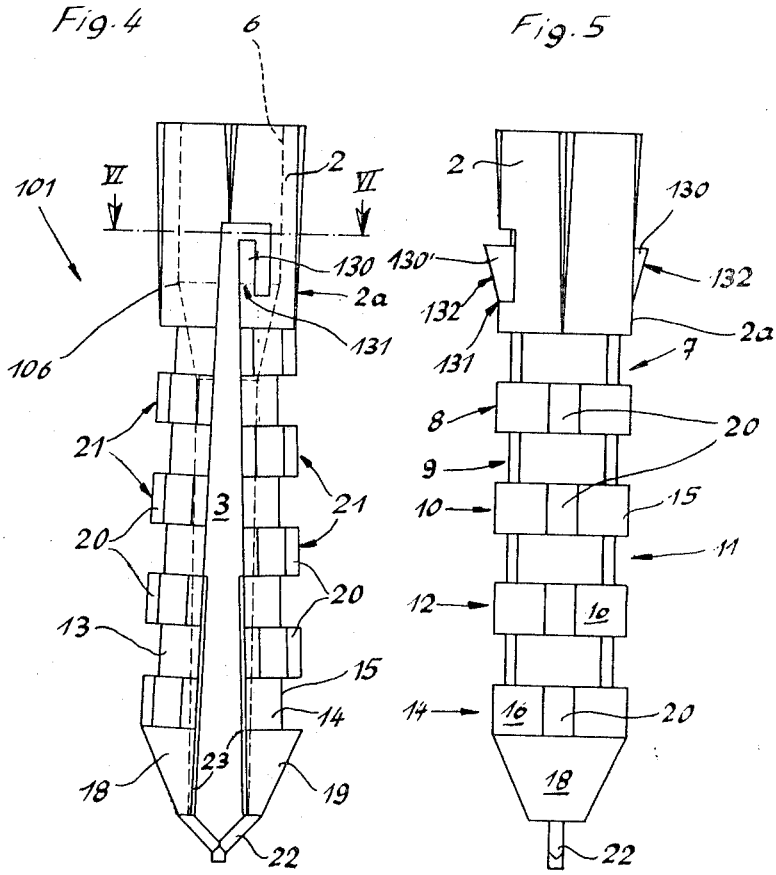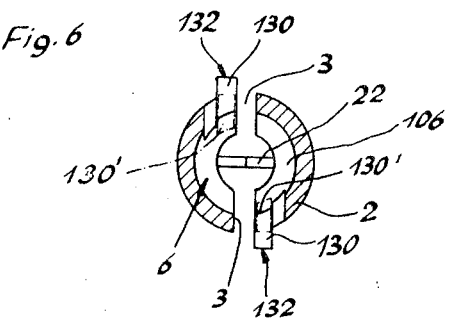

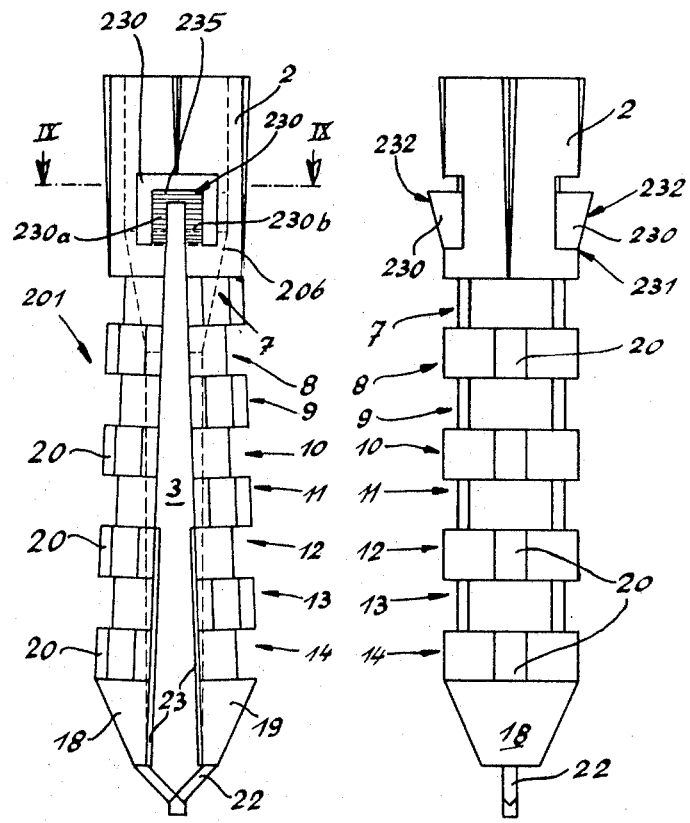
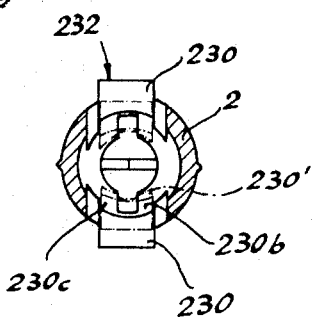

U.S. PATENT 3,522,756
AXIALLY SPLIT EXPANDING PLUG OF ELASTICALLY FLEXIBLE MATERIAL FOR AN ANCHOR BOLT OR SCREW

BACKGROUND OF THE INVENTION

This invention relates to expanding plugs, and more specifically to an axially split expanding plug of elastically flexible material for an anchor bolt or screw, comprising a tubular portion at its rear end and having elevations projecting from its peripheral contours.

Various forms of construction of such plugs are known in the art. Generally they are integral plastic moldings with an axial slit dividing their leading end into two expandable shanks having profiled peripheral surfaces to grip the walls of the hole into which the plug is inserted. When an anchoring means, such as a bolt, is screwed into such a plug in a hole, or also when a nail is driven into the plug, the expandable shanks are splayed apart into tight contact with the walls of the hole. The above-mentioned surface profiles, particularly in the region of the two shanks, provide additional axial and circumferential fixation, preventing the plug from being extracted or turned in its hole. However, the degree of anchorage these circumferential configurations provide is still somewhat limited and not always sufficient.

SUMMARY OF THE INVENTION

It is therefore the object of the present invention to provide an expanding plug which affords satisfactory anchorage in its hole in both the axial and peripheral directions. It is a more particular object of the invention that anchorage should already be created when the bolt begins to be screwed into the plug and at the same time that the plug should firmly hold both in a hard and in a softer material.

These objects are attained according to the invention by the provision of an axially split expanding plug of elastically flexible material for an anchor bolt or screw, having a tubular portion with a longitudinal bore at its rear end and elevations projecting from its peripheral contours, in which the divided portion of the plug comprises, at least along part of the length of the dividing slit, consecutive sections of polygonal cross section, each section being angularly displaced in relation to the adjoining sections in such a way that the corners of one section project beyond the flats of an adjoining section.

Preferably a large number of such sections of polygonal and preferably pentagonal shape may be provided.

Moreover, at least some of the corners of said polygonal sections may with advantage be enlarged and widened.

In an important and advantageous further development such a plug may be provided with at least one projection having the form of an elastically flexible nib formed integral with part of the wall of the plug. Preferably this nib may be located in the region of a coned section of the longitudinal bore in the plug. Moreover, the inside of the nib facing the longitudinal bore in the plug may project into the open cross section of the bore when the outside of the nib is roughly flush with the external contour of the plug.

BRIEF DESCRIPTION OF THE DRAWINGS

The invention will now be described by way of example and with reference to the accompanying drawings in which:

FIG. 1 is a side elevation of one embodiment of the proposed plug;

FIG. 2 is a cross section taken on the line II - II of FIG. 1;

FIG. 3 is a cross section taken on the line III - III of FIG. 1;

FIG. 4 is a side elevation of another embodiment of the proposed plug, formed with an elastically flexible anchoring nib;

FIG. 5 is a side elevation of the plug in FIG. 4, but seen at right angles to the elevation in FIG. 4;

FIG. 6 is a cross section taken on the line VI - VI of FIG. 4.

FIG. 7 is a side elevation of a third embodiment of the proposed plug, slightly modifying the form of construction in FIG. 4, FIG. 8 is a side elevation of the plug shown in FIG. 7, but seen at right angles to the elevation in FIG. 7, and FIG. 9 is a cross section of an expanding plug taken on the line IX - IX in FIG. 7.

DESCRIPTION OF THE PREFERRED EMBODIMENTS

The expanding plug generally indicated by the reference numeral 1 and hereinafter briefly referred to as "plug' has a tubular rear end 2, whereas its forward end is divided by a slit 3 which separates two roughly semicylindrical expandable shanks 4 and 5. A longitudinal bore 6 extends through the plug 1 and is so designed that in the conventional manner a bolt or nail can be inserted into the plug 1 to force apart and expand the shanks 4 and 5.

The forward end of the plug 1 which consists of the two expandable shanks 4 and 5 comprises a plurality of sections 7 to 14 of pentagonal or some other polygonal cross section, each consecutive polygonal section being angularly turned in relation to the preceding section. Consequently the corners 15 of each section project beyond the sides 16 of the adjacent section (FIG. 2). The resultant peripheral configuration creates a major number of projections 17 which project beyond the contours of the neighboring sections, and which are uniformly distributed over the entire surface of the shanks 4 and 5 of the plug 1. When a bolt or the like is inserted into the plug and the two shanks 4 and 5 are forced apart these projections 17 provide anchorage in the hole containing the plug. The projections 17 are fairly rigid and they can bite to some extent into the internal walls of the hole. This effect will be the more pronounced the softer the material surrounding the plug is, that is to say when the plug 1 is harder than the material in which it is anchored. These projections 17 already bear against the walls of the hole immediately the plug 1 is inserted into the same and the plug cannot therefore easily turn in the hole even before a bolt is screwed into the same. As the bolt penetrates further into the interior of the plug this effect is increased by the gradual separation of the two shanks 4 and 5.

The proposed plug 1 is not merely useful for walls and the like consisting of materials that are softer than that of the plug 1, but it can also be employed with advantage to provide anchorage in materials that are very hard, such as granite. Since a drilled hole is never exactly cylindrical and its walls contain minor elevations and irregularities, the projections 17 and the corners 15 can engage these irregularities for securely locating the plug. This anchoring effect is further assisted by the fact that the shanks 4 and 5 of the plug 1 already have a slight outward set before they are forced further apart. This can be clearly seen in FIG. 1. When the plug is inserted into a hole of appropriate dimensions these outwardly set shanks 4 and 5 are radially slightly compressed. The compression of the shanks of the plug 1 and its insertion are facilitated by the leading end of the plug in the region marked 18, 19 tapering to a point. The corners 20 of all the sections 7 to 14 which lie in a plane perpendicular to the plane of the slit 3 are enlarged in such a way that faces 21 formed on these enlarged corners 20 are approximately parallel to the plane of the slit (cf. FIGS. 2 and 3). The enlarged corners 20 likewise assist in facilitating the insertion of the plug 1 into the hole.

In a further development of the invention the shanks 4 and 5 are elastically interconnected by a Vee-shaped elastic web 22. The presence of this web 22 prevents the shanks 4 and 5 from being thrust too far apart. This is particularly useful in cases in which the plug 1 must first be passed through an outer component before its end enters the anchoring hole in which it is to hold a bolt. During the passage of the shanks 4 and 5 through the outer component they could undesirably be splayed open by frictional or other engagement with the hole in this outer part through which the plug is merely intended to pass. If the shanks 4 and 5 of the plug were unduly widely separated before entering the hole difficulties would arise in making it enter the hole. The otherwise desirable configuration of the surface of the shanks would even operate to accentuate these difficulties. However, the presence of the Vee-shaped elastic web 22 prevents undue separation of the shanks. The web can be readily formed by making use of the ingate riser of the injection molded plug. The ingate of the mold in which the plug 1 is produced may be arranged to form a fork of which each branch leads to one of the shanks 4 and 5, the vertex angle of the fork as well as its cross section being so designed that the Vee-shaped elastic web 22 which forms in the fork has the desired dimensions and size to provide the required restraining forces for holding the shanks 4 and 5 after completion.

According to yet another feature of the proposed expanding plug 1 the open width of the slit 3 in the region of the leading end of the plug may be reduced from the periphery of the plug inwards to the longitudinal bore 6. This will be readily understood by reference to FIG. 1 and by comparing the contours of the slit 3 in the sections shown in FIG. 2 and 3. Portions 23 can be seen to project towards the centre of the longitudinal bore 6 and the longitudinal centre plane of the slit 3. This has the advantage that in the region which is of primary importance for anchoring the plug 1 the envelopment angle around the threads of an inserted wood screw of the like is quite significantly increased. Moreover, these projecting portions 23 favorably affect the outward expansion and hence the anchoring effect of the projections 17.

Another important optional feature of the invention is illustrated in FIGS. 4 to 9. The plug which in these figures bears the reference numerals 101 and 201, and which generally corresponds to the plug 1 already described with reference to FIGS. 1 to 3 is further provided, according to a further proposal of the invention, with at least one, and in the embodiment of the plug 101 in FIGS. 4 to 6 with two projections 131 which are integral with parts of the plug wall, and which form slightly elastically flexible nibs. With reference to FIGS. 5 and 6 the manner in which two nibs 130 adjacent the slit 3 in the plug 101 form these special projections on approximately diametrically opposite sides will be readily understood. The nibs are integrally molded with the body of the plug 101 from a slightly flexible plastics material. At least part of these nibs may be located where the longitudinal bore 6 in the plug 101 forms a cone 106, whereas their external faces 132 project radially slightly beyond the peripheral contour of the plug 101. When the plug 101 is inserted into a hole these projections in the form of nibs 130 adapt themselves to the internal diameter of the hole by yielding slightly into the interior of the plug, as indicated in dotted lines in FIG. 6 at 130'. When a bolt or anchoring screw is subsequently screwed into the plug 101 these nibs 130 will have already been urged by their elasticity into tight contact with the walls of the hole. At the same time the bolt or screw will immediately apply outward pressure to those parts of the nibs which project inwardly into the longitudinal bore 6, as indicated by 130', and as soon as the bolt begins to be screwed into the plug these parts are forced outwards and cause the plug 101 to be securely held in its hole and more particularly prevented from rotating. In practice these nibs 130 as well as the above-described projections 17 and the corners 20 engage and anchor themselves in the hole as the bolt penetrates further into the interior of the plug. In other words the described effect of the projections 17 and corners 20 when the plug is expanded is preceded by a similar effect of another part of the plug, namely of the nibs 130, when the first turns are imparted to the bolt immediately after its insertion. The described nibs 130 form a part of the wall of the plug, and a bolt or screw inserted into the longitudinal bore 6 has a similar action upon these nibs 130 as upon the shanks 4 and 5.

Whereas in the embodiment of the plug 101 in FIGS. 4 to 6 a flexible nib 130 projecting axially to the rear is provided at the rear end of the slit on each side of the plug, this arrangement is somewhat modified in the embodiment illustrated in FIGS. 7 to 9. The nib 230 on each side of the plug 201 in this latter embodiment is divided and embraces the sides of the rear end of the slit 3, two arms 230a and 230b of the nib being connected by a web 235. In other words, the nibs 230 in the plug 201 are symmetrically disposed in relation to the longitudinal centre plane of the slit 3 dividing the plug. It is preferred to shape the nibs 130 or 230 in such a way that they resemble barbs, as indicated in FIGS. 5 and 8. This assists the nibs in biting into the hole and in preventing the plug from being extracted. For the same reason the nibs 130 and 230 have sharply angular cross sections as clearly shown in FIGS. 6 and 9 to permit the nibs to stop the plug from being rotated. FIGS. 6 and 9 also clearly show that the inside of each nib facing the longitudinal bore 6 in the plug projects into the cross section of the bore when the outside 132, 232 of the nib 130, 230 is flush with the remainder of the plug contour, as indicated in dot and dash lines at 130' and 230'.

It should be observed that the projections 17, the corners 20, and the nibs 130 and 230 may project not only beyond the level of the flats of a neighboring polygonal section but also beyond other parts of the wall of the plug 1, 101 or 201, for instance beyond the outside surface of the tubular portion 2a of the plug. In embodiments of the invention the several features which have been described in greater detail may be combined in a number of different ways.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. An axially split expanding plug of elastically flexible material for an anchor bolt or screw, having a tubular portion with a longitudinal bore at its rear end and elevations projecting from its peripheral contours, in which the divided portion of the plug comprises, at least along part of the length of the dividing slit, consecutive sections of polygonal cross sections, each section being angularly displaced in relation to the adjoining sections in such a way that the corners of one section project beyond the flats of an adjoining section, at least some of the corners of the polygonal sections being enlarged and widened, the faces of the widened corners extending roughly parallel to the plane of the plane of the slit dividing the plug.

2. An expanding plug according to the claim 1 wherein the open cross section of the slit narrows from the peripheral surface of the plug inwards towards the longitudinal bore in the plug and having expanding shanks biased to give them an outward set.

3. An expanding plug according to claim 2, wherein the expanding shanks are elastically interconnected by a web which counteracts unduly wide separation of the shanks, and the web is the ingate riser the leading end of the expanding shanks having a conicial taper.

4. An expanding plug according to claim 1, having at least one projection in the form of an elastically flexible nib formed integral with part of the wall of the plug, at least part of the nib being located in the region of a coned section of the longitudinal bore in the plug, the inside of the nib facing the longitudinal bore in the plug projecting into the cross-section of said bore when the outside of the nib is roughly flush with the external contour of the plug, the rear end of the dividing slit on each side of the plug being provided with a substantially axially disposed nib with its flexible end pointing rearwards.

5. An expanding plug according to claim 4, wherein the nib is divided, preferably comprising two parts embracing the rear end of the slit and connected by at least one transverse web.